Figure 1:
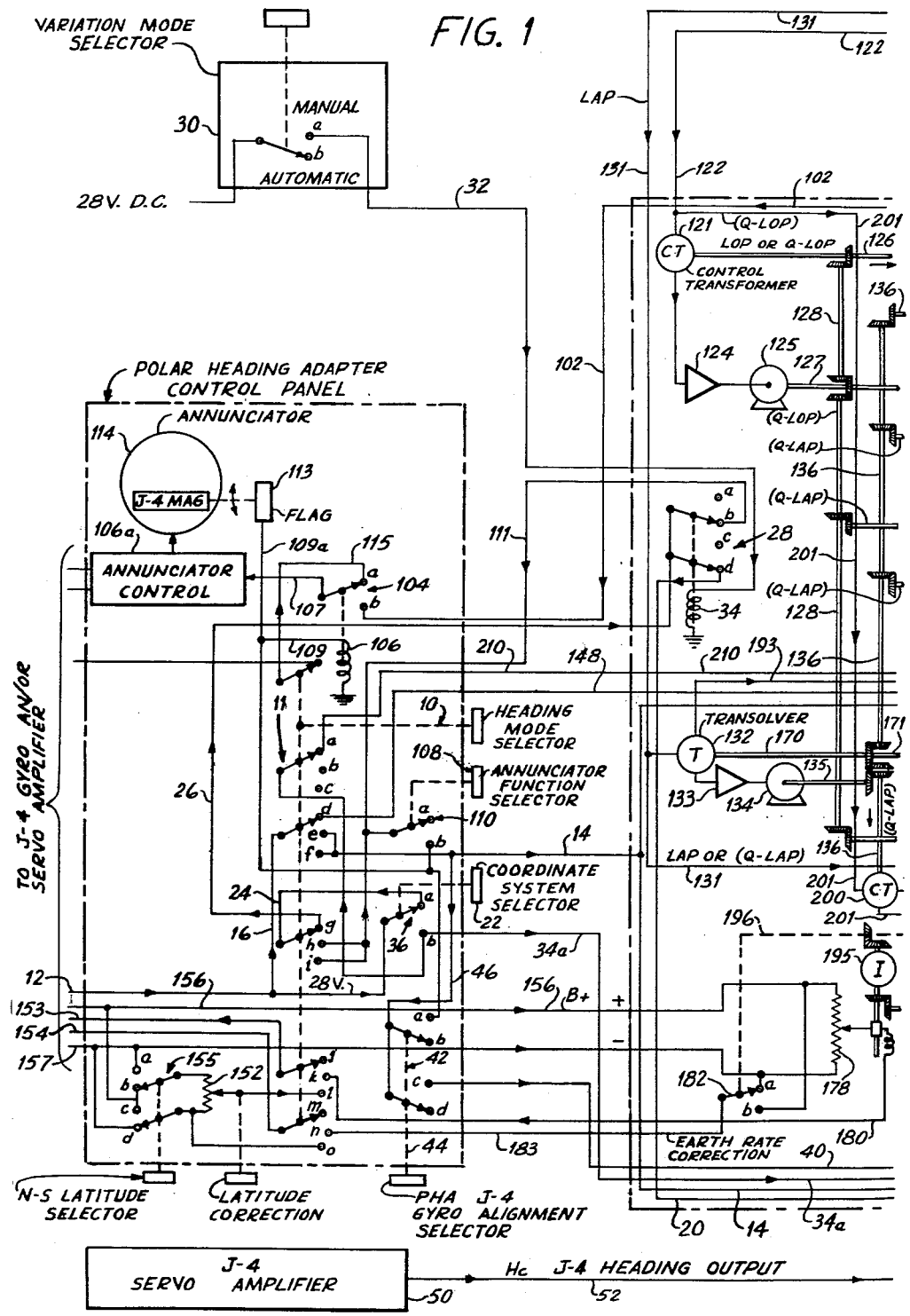

United States Patent Office 3,022,008
Patented Feb. 20, 1962

3,022,008
POLAR HEADING ADAPTER
Patrick J. McKeown, Syosset, and Stamates I. Frann, Whitestone, N.Y., assignors to Sperry Rand Corporation, Ford Instrument Company Division, Wilmington, Del., a corporation of Delaware
Filed June 2, 1959, Ser. No. 817,628
9 Claims. (Cl. 235—187)

This invention relates to a device which provides heading information for existing automatic navigational computers. The device functions in both lower and polar latitudes and is operable from either magnetic or gyro compass information and has sufficient selectivity to permit transition from the magnetic to gyro compass mode of operation and to provide the appropriate heading corrections required by the associated navigational computer in determining positions and by the present device for computing headings for transmission to the navigational computer. The device is designed to be associated with many of the presently known available navigation computing systems.

The primary purpose of the polar heading adapter is to provide the necessary heading correction information that will enable navigational computers, such as the Computer Set, Navigational AN/ASN-7, to operate throughout the world. The ASN-7 computer normally computes and displays navigation information when it is operating within the 70° north and south parallels. This 70° latitude limitation was necessarily imposed on the computer by the rapid convergence of the meridian lines and the loss of magnetic heading information in the higher latitudes. To overcome this polar limitation of navigational equipment, present position can be displayed in transverse coordinates. The transverse coordinate system of latitude and longitude is attained by rotating the normal coordinates through 90° about an axis which is formed by the intersection of the normal 90° meridian plane and the normal equatorial plane. The position of the transverse north pole will be on the intersection of the normal 180° meridian and the equator. In this coordinate system the transverse meridian planes do not converge at the normal poles, but are widely spaced, thereby permitting navigational computers to compute present position in transverse coordinates when operating near the normal poles. To enable navigational systems to compute present position in transverse coordinates, the heading angle no longer can be measured from the normal meridian, but must now be measured from the transverse meridian. Therefore, when receiving magnetic compass heading, a correction angle equal to the dihedral angle between the transverse and normal meridian planes at the point of operation must be added to the compass heading. As a result, one of the functions of the polar heading adapter, when operating with a magnetic compass, is to calculate the polar correction angle from transverse latitude and longitude.

In order to compute true heading automatically, the polar heading adapter provides magnetic variation information in either coordinate system to the navigational computer when operating in the magnetic heading mode.

As the magnetic poles are approached, magnetic compass information becomes increasingly unreliable, necessitating the use of a directional gyro as a heading reference. The directional gyro requires earth rate and convergency corrections in order to provide usable heading information to the navigational computer. Earth rate is a function of normal latitude while convergency is a function of the latitude and the longitude rate in the coordinate system being used. The polar heading adapter is instrumented to compute these corrections automatically from the present position information. As a result, the polar heading adapter, in conjunction with the directional gyro, can compute true heading with respect to either the normal or transverse meridians.

Several other features have been incorporated in the polar heading adapter to extend the versatility of associated navigational equipment and to improve the reliability and accuracy of the transmitted heading information. The versatility has been extended by including mechanism to permit the continuous visual presentation of magnetic variation in the navigational computer when operating in either coordinate system, and a facility has been provided to continuously transmit true heading information to dependent equipment. To improve the reliability and accuracy of heading information, the polar heading adapter true heading output can be automatically compared to the remote sighting astro tracker output, under certain conditions, and corrected accordingly.

Several modes of operation have been provided to give the polar heading adapter universal application. The transverse directional gyro mode is used when operating in the normal polar regions. For operations between the limits of 70° normal latitude and 70° transverse latitude, any mode of operation can be used with either the transverse or normal coordinate system. For example: the magnetic mode in which the polar heading adapter receives magnetic compass information; the manual directional gyro mode, in which directional gyro heading information is supplied to the polar heading adapter by the J-4 which is manually adjusted for earth rate corrections; the automatic directional gyro mode, in which the directional gyro information is provided by the J-4 which receives automatic earth rate correction from the polar heading adapter. The directional gyro mode must be used when operating in transverse coordinates in the vicinity of the magnetic poles. For operation above 70° transverse latitude the normal coordinate system modes of operation must be used. As an illustration, a typical flight from New York across the poles would use the transverse coordinate system beginning in the magnetic mode and switching to the directional gyro mode as the 70° normal latitude line is approached. Another scheme of operation could employ a switching of coordinate systems during flight; however, this arrangement would prove to be impracticable since the present position display would have to be slewed from normal to transverse coordinates.

The operation of the polar heading adapter during flight is extremely simple, involving only the possibility of switching from one heading mode to another. Even during switching the proper heading information is being continuously computed and transmitted to the navigation equipment. At the beginning of a flight, a few simple procedures must be followed. When starting in the directional gyro mode, with the gyro axis oriented to either the transverse or normal pole, depending on the coordinate system to be used, the true heading transmitters must be synchronized to the J-4 compass output transmitters. This operation is servoed automatically, but is initiated and monitored by merely holding the alignment switch in the align position until the annunciator shows synchronism. The magnetic mode offers the simplest starting procedure with all recivers and transmitters being automatically synchronized when the heading selector switch is in the magnetic mode.

The polar heading adapter has been designed to be completely flexible. The choice of operation is to be decided by the pilot on the basis of the region of origin and the flight path. The polar heading adapter will provide usable heading information in either the normal or transverse coordinate systems and when operating from either a slaved magnetic or directional gyro heading source. Almost any combination of the available facilities may be chosen and transition in flight may be made between the magnetic and directional gyro modes. The heading output of the J-4 serving other equipment is left completely undisturbed (except when adjusting to the remote sighting astro tracker) so that associated heading indicators may be used just as if the polar heading adapter was not present. None of the J-4 facilities has been compromised by this unit, but rather a usable heading reference has been provided to navigational computers that previously could not make full use of this heading source.

Figure 2:
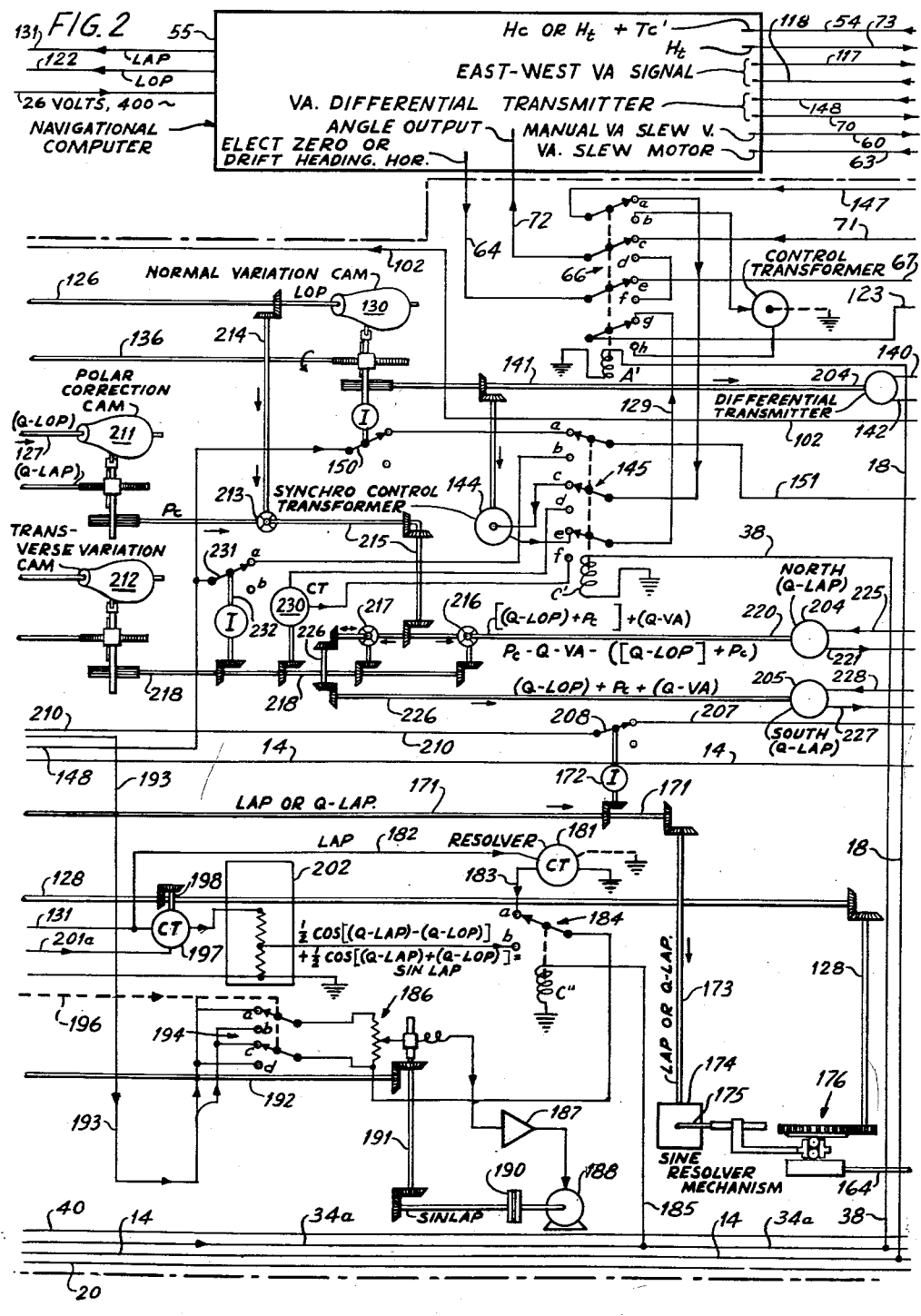
Figure 3:
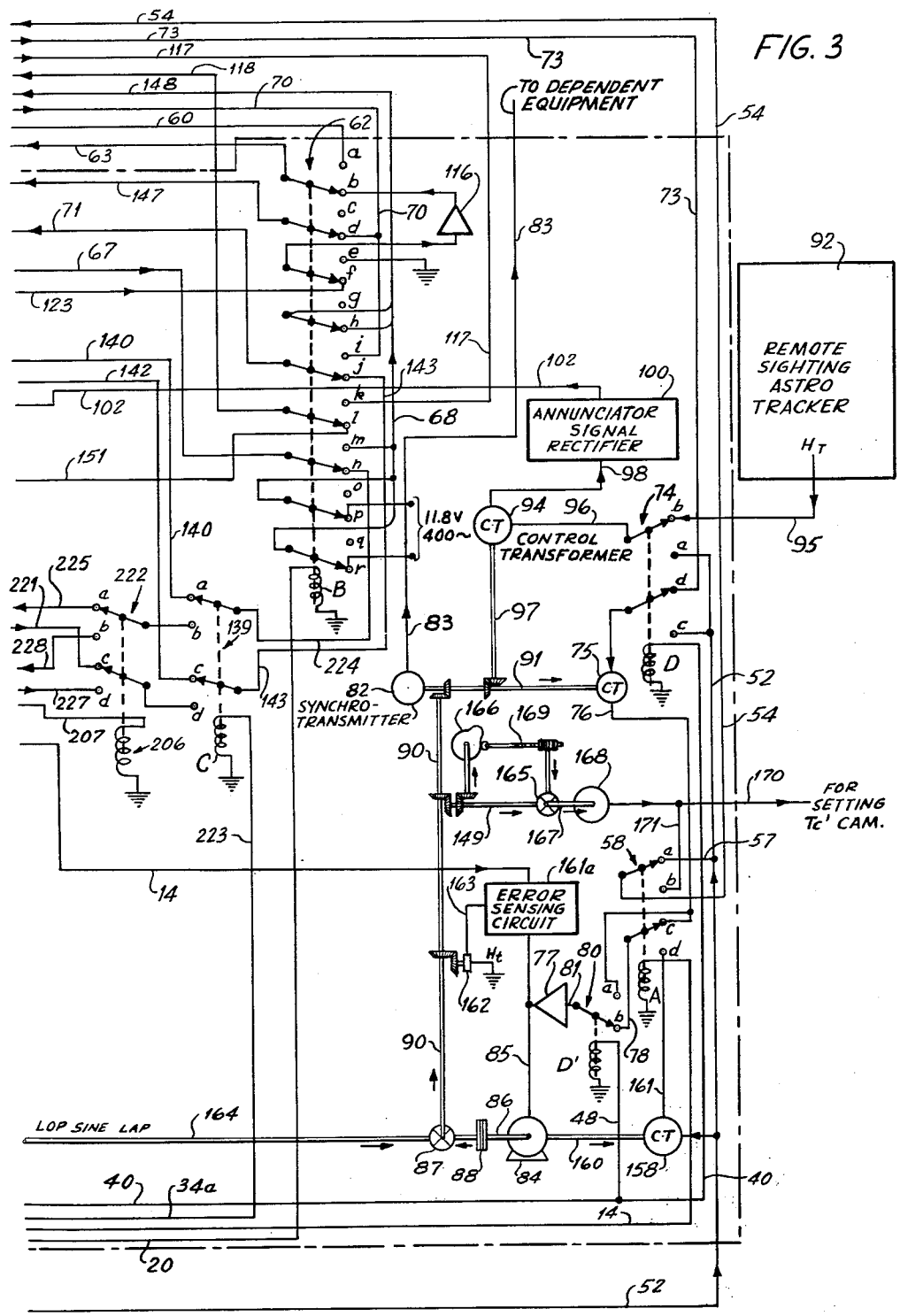
Figure 4:
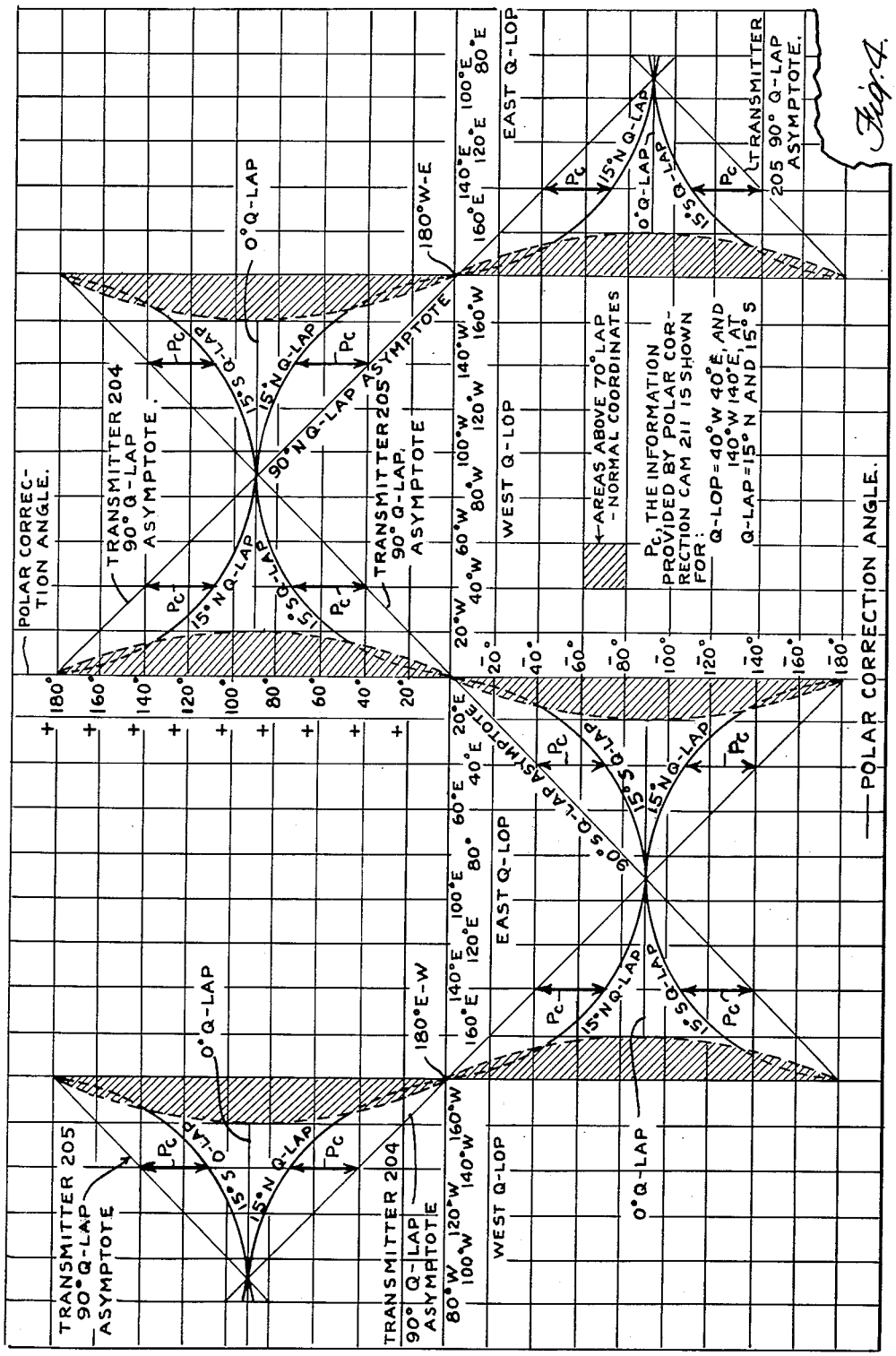

The invention may be better understood by reading the following detailed description thereof taken in conjunction with the drawings, in which FIGS. 1, 2 and 3 show schematically polar heading adapter, and FIG. 4 is a graph showing a means for determining polar correction angles for selected positions of longitude and latitude in transverse coordinates.

Referring to the drawings, there are five basic relays employed by the polar heading adapter to establish the various Heading, Variation and Coordinate System Modes of Operation. Relay A is operated by the heading mode selector 10 and gang switch 11 which is arranged to connect a 28 volt D.C. line 12 to relay conductor 14 by means of lead 16 and contact $f$ of the gang switch 11. The conductor 14 is thereby adapted to energize the relay A and additionally operates the relay A′ by virtue of its connection with the lead 18. Relay B is also adapted to be energized by the D.C. line 12 which may be connected to the relay conductor 20 by operation of the coordinate system selector 22, the lead 24, contact $g$ of the gang switch 11, lead 26, and the contact $d$ of the switch 28 which is energized by the variation mode selector 30 and the lead 32 which connects the manual contact $a$ of the variation mode selector to the relay 34 for the switch 28. Relay C, C′ and C″ are connectable to the D.C. line 12 by virtue of their connection to the conductor 34$_a$ which is energizable by the line 12 when the coordinate system selector positions the switch 36 to contact $b$ at which position the line 12 is joined to the conductor 34$_a$. The conductor 34$_a$ energizes the relay C′ by means of lead 38 and energizes the relay C″ by means of lead 185. The relays D and D′ are operated by the relay conductor 40 which is joined to contact $c$ of the switch 42, which is operated by alignment selector 44, lead 46, lead 14, contact $f$ of the gang switch 11, the lead 16 and the D.C. line 12. The relay D′ is operated from the relay conductor 40 by virtue of the connecting lead 48.

I. *Slaved magnetic-manual variation-normal coordinate mode*

When the polar heading adapter is operated in the magnetic mode, compass heading $H_c$ is transmitted by the J-4 servo amplifier 50 and placed onto the conductor 52 which is connectable to the heading input lead 54 for the navigational computer 55 by means of line 57 and contact $a$ of the gang switch 58 operated by the relay A and the contact $a$.

Magnetic variation may be introduced manually into the navigational computer 55 or automatically by the polar heading adapter and introduced into the computer when the adapter is operated in the magnetic mode. When introduced manually, a motor control voltage is received from the computer on lead 60. Contact $a$ of gang switch 62 operated by the relay B and variation motor control lead 63 which introduces the motor control signal to the navigational computer 55, results in a variation slewing motor in the computer being thereby manually controlled by selection of voltage input to the lead 60. When relay A′ is in magnetic position and relay B is in manual variation position, an electrical zero signal on lead 64 is routed back to the navigational computer 55 through contact $e$ of gang switch 66 operated by the relay A′, lead 67, contact $m$ of the gang switch 62 and computer input lead 68. Additionally, the magnetic variation synchro lead 70 is also routed back to the computer 55 when the relays A′ and B are in this position, the lead 70 being joined to the contact $i$ of the gang switch 62, the lead 71, contact $c$ of the gang switch 66 and the navigational computer input lead 72.

With the polar heading adapter set to operate in the magnetic mode, true heading $H_t$ is determined by the navigational computer 55 and transmitted on lead 73 which is joined to contact $d$ of gang switch 74 operated by the relay D from which it is fed to control transformer 75 which supplies an error signal to contact $c$ of the gang switch 58 by means of lead 76 and to the amplifier 77 through lead 78, contact $b$ of the gang switch 80 operated by the relay D′ and amplifier input lead 81. The amplifier 77 is employed to drive the synchro transmitter 82 and to null the control transformer 75 to assure that true heading is placed into the transmitter 82 which makes this quantity available to dependent equipment as on lead 83. This is achieved by virtue of the fact that the amplifier 77 is employed to drive the servo motor 84 to which it is connected by lead 85. Output shaft 86 of the servo motor 84 serves to introduce true heading quantity to one side of differential 87 through friction slip drive connection 88. The differential output is placed on spider shaft 90 which is geared to the shaft 91 which is employed to position the control transformer 75 and the synchro transmitter 82.

Operating in the magnetic mode and where a correct true heading reference is available as from a remote sighting astro tracker 92, the true heading quantity $H_t$ may be corrected before it is made available to the dependent equipment. In this case, the astro tracker 92 is connectable to a control transformer 94 through an output lead 95, contact $b$ of the gang switch 74 and true heading lead 96 which is employed to reference the control transformer 94, the rotor of which is positioned by a rotor shaft 97 which is in pinion connection with the shaft 91. The control transformer 94 is enabled thereby to produce an error voltage for true heading which is placed on the output lead 98 and rectified by the annunciator signal rectifier 100. Rectifier output lead 102 joins the rectifier 100 to contact $b$ of the switch 104 operated by relay 106. In order that the switch 104 be in position $b$ so that the variation correction lead 102 is connected to the annunciator control 106 by lead 107, the selector switches must be appropriately positioned and annunciator function selector 108 is manually operated so that the switch arm of switch 110 is in contact with contact $b$ of that switch so as to permit D.C. voltage to be supplied from the lead 12 through contact $a$ of the switch 36, contact $g$ of the gang switch 11, contact $b$ of the switch 28 and contact $b$ of the switch 110 which is joined to the contact $b$ of the switch 28 by the lead 111. The contact $b$ of the switch 110 being connected to relay 106 by lead 109 and which is employed to operate the switch 104 and the setting of the various selector switches to cause the energization of the annunciator control will then cause flag mechanism 113 energized by lead 109$a$ from the lead 109 to position the flag in the annunciator 114 so as to cover J-4 indication thereby showing that the annunciator is being controlled by the polar heading adapter and the astro tracker 92 and also will cause the D.C. error signal supplied on the contact $b$ to activate the annunciator control 106$_a$ and thereby display the error on the calculated true heading quantity $H_t$ on annunciator 114. This true heading error may be removed by adjusting the manual variation input to the navigational computer.

If the annunciator function selector 108 throws the switch 110 to position $a$, the D.C. voltage from line 12 will no longer be supplied to the relay 106 and to the flag mechanism 113. This has two effects, namely, the flag and annunciator 114 is brought up to indicate that the annunciator is not indicating a corrected true heading and the switch 104 is placed in a position $a$ which connects the annunciator control 106$_a$ to lead 115 so that the annunciator 114 functions in the conventional manner of heading generators in lieu of the present equipment.

Contact $e$ of the gang switch 62 connects variation display amplifier 116 to ground when the relay B is in manual variation position. Additionally, because with some navigational computers a 28 volt D.C. relay signal is required when the computer is in west variation, contact $k$ is employed to connect the 28 volt D.C. line 117 to navigational computer input lead 118 when the relay B is in manual variation position.

II. *Slaved magnetic—automatic variation— normal coordinate mode*

When the polar heading adapter is operated in this mode, the same components are employed to introduce compass heading H$_c$ into the computer 55 which calculates true heading H$_t$ which is servoed to dependent equipment on lead 83 and to the annunciator as an error signal combined with the true heading obtained in the remote sighting astro tracker.

This mode of operation is distinguished by the fact that magnetic variation is automatically introduced. To this end, indicator 120 for the navigational computer 55 transmits present longitude L$_{op}$, to control transformer 121, by means of lead 122. The control transformer 121 is part of a self-balancing servo loop network which also includes servo amplifier 124, servo motor 125 and feedback shaft 126 which receives the output of the motor on shafts 127 and 128. The shaft 126 serves to drive in rotation three-dimensional cam 130 which contains the world's magnetic variation. Present latitude, L$_{ap}$, is placed on lead 131 by the indicator 120 which energizes transolver 132, one output of which is introduced to amplifier 133 and motor 134. The transolver 132 is a resolver having two output windings disposed across each other with respect to the inductively related three wire input windings. Connected shafts 135 and 136 driven from the motor 134 are employed to position a cam follower on the surface of the cam 130. The cam follower output is proportional to local variation after the cam has been rotated to the value of present longitude and the follower has been moved to a position corresponding to present latitude.

Electrical zero as calculated by the computer 55 is placed into one input side of differential transmitter 138 by means of the lead 64, contact $e$ of the switch 66, the lead 67, contact $n$ of the switch, which is placed in the unenergized, automatic variation position by the relay B and the variation mode selector 30 in control thereof, contact $a$ of switch 139 controlled by the relay C and lead 140. Cam calculated variation on cam follower output shaft 141 is placed into the other input side of the differential 138 the output of which returns a quantity representing electrical zero plus variation to the computer by way of lead 142, contact $c$ of the switch 139, lead 143, contact $j$ of the switch 62, the lead 71, contact $c$ of the switch 66 and the computer return lead 72.

Because in this mode the variation slew motor in the computer is actuated by the adapter instead of manually, variation is also placed into the synchro control transformer 144 by the shaft 141. The variation differential transmitter in the navigational computer 55 is used as a synchro transmitter. This is accomplished by shorting two of its leads using contact $h$ of switch 62 and connecting 11.8 volts, 400 cycles per second between the shorted leads and the differential transmitter's third lead, which is in lead wire 148, through contacts $p$ and $u$ of switch 62. The output leads of the differential transmitter connect to the control transformer 144 through contact $d$ of switch 62, lead 147, contact $a$ of switch 66, lead 146 and contact $c$ of switch 145. The rotor output leads of control transformer 144 are connected to the variation display amplifier 116 by lead 137, contact $e$ of switch 145, lead 129, contact $g$ of switch 66, lead 123 and contact $f$ of switch 62. Amplifier 116 drives the variation slew motor in the navigational computer 55 through contact $b$ of switch 62 and lead 63. Since this is a closed loop self-balancing servo, the amplifier 116 will drive the variation differential transmitter until it agrees with the value of local variation existing on shaft 141 and thereby to control transformer 144.

The computer's variation counter is thereby caused to display the cam calculated variation demonstrating that the automatic computation is functioning.

When the computer 55 is operating in west longitude, it requires a D.C. relay signal. To this end, a lead 148 is provided which is connectable to contact $d$ of the switch 11 to receive the relay voltage on the lead 16 and feed it to switch 150 operated by the variation cam 130 through an intermittent drive to close in west variation. In closed position, the switch 150 is connected to the contact $a$ of the switch 145 in normal coordinate position and by lead 151 to contact $l$ of the switch 62. In automatic variation position, the contact $l$ of the switch 62 is connected to the computer input lead 118 which is thereby adapted to place the required D.C. relay voltage into the navigational computer.

III. *Directional gyro—normal coordinate—manual earth rate correction mode*

Generally, the polar heading adapter operates to convey true heading H$_t$ to the navigational computer 55 when the adapter is functioning in the directional gyro mode. The heading is actually generated by gyros which form part of the equipment not within the scope of this invention. Directional gyros require correction for the movement of the earth and accordingly earth rate corrections are afforded the gyros manually when the system is operated in this mode. To this end, the heading mode selector 10 is turned until the switch 11 is placed in manual directional gyro position and earth rate corrections appearing across the potentiometer 152 adjusted for position north and south of the equator and for latitude are fed to the directional gyros by means of contacts $l$ and $o$ and reference voltage lead 153 and reference ground lead 154, respectively. Polarity contacts $a$, $b$, $c$ and $d$ of the north-south selector switch 155 and reference voltage leads 156 and 157 are employed to manually select the appropriate voltage excitation for the potentiometer 152.

The gyro heading is placed on the lead 52 from which it is introduced to the control transformer 158. On switching from magnetic to the directional gyro mode of operation, the mechanical input to the control transformer 158 on servo motor output shaft 160 is normally at a different value for true heading from the new heading value as determined by the directional gyros. Therefore, an error will appear on the control transformer output lead 161 which is placed onto contact $b$ of the switch 80 due to the fact that the switch 58 is placed in manual directional gyro position by the relay A. Contact $b$ of the switch 80 is placed in connection with servo amplifier 77, the servo motors 84 and shaft 160 which together with the control transformer 158 constitute a fast follow-up servo loop for the directional gyro output on the lead 52.

Additionally, when an error voltage appears in the output of the transformer 158, an error sensing circuit 161$_a$, which is connected to the 28 volt supply by leads 14 and 14$_a$, is energized which similarly energizes magnetic clutch 162 by the connecting lead 163 so as to lock the H$_t$ shaft 90. During this short transmission period while the shaft 90 is locked, the aircraft bearing polar heading adapter should maintain a constant heading and the output of servo motor 84 and the meridian convergency correction input which are placed into the two input sides of the differential 87 are run out through the friction slip clutch 88 until the error signal output of the control transformer 158 has been nulled. When the error in the transformer output becomes zero, the error sensing circuit 161$_a$ deenergizes itself and releases the H$_t$ shaft 90 by deenergizing the magnetic clutch 162. Thereafter, the error sensing circuit 161$_a$ cannot be reenergized until the heading mode selector is switched to magnetic and back to directional gyro (that is, until the D.C. voltage is removed and then reapplied to the contact $f$ of the switch 11 by the heading mode selector 10).

After the magnetic clutch 162 is released, one of the two correction factors for true heading as made available on the lead 52 is combined therewith. This factor is to correct for meridian convergency, and as explained below, appears on the shaft 164 which is connected into input side of the differential 87. Thereafter the computed true heading will position the synchro transmitter 82, the control transformers 75 and 94 and turn one input of the differential 165 which serves to correct the computed true heading for transmission error.

The other input to the differential 165 is introduced by transmission error correction cam 166 which is driven by shaft 149 conveying the computed quantity true heading H$_t$.

Cam follower shaft 169 driven by the cam 166 and connected to the other input side of the differential 165 is adapted to introduce the correction for transmission error T$_c'$. The differential output shaft 167 which has the combined quantity true heading H$_t$ and transmission error T$_c'$ positions the transmitter 168 which has two outputs on leads 170 and 171, the lead 171 being connected to contact $b$ of the switch 58 controlled by the relay A to place the combined quantity H$_t$ plus T$_c'$ into the navigational computer where the quantity transmission error T$_c'$ is subtracted therefrom to yield true heading. The second output lead 170 feeds the combined quantity H$_t$ plus T$_c'$ to a repeater indicator (not shown) for setting T$_c'$ cam for the navigational computer so that the indicator may read the same heading as the navigational computer's heading check dial.

True heading correction for meridian convergency may be made by combining with true heading the product of present longitude Lop rate and the sine of present latitude. As indicated above, this correction factor is combined in the differential 87 with the gyro heading quantity made available to the polar heading adapter on lead 52. To this end, present latitude quantity Lap on lead 131 which operates the control transolver 132 and is amplified and servoed to the shaft 136 by the amplifier 133 and the servo motor 134 and output shaft 135 is fed back to the transolver 132 on shaft 170 and placed on the shaft 171 which turns shaft 173 to drive the sine resolver 174 and which turns intermittent gear mechanism 172, the output of which operates switch 208 to sense north or south Q-Lap. Output shaft 175 of the resolver is connected to the ball carriage of integrator 176 to position the carriage on its disc which is driven by the present longitude shaft 128. The roller output shaft 164 conveying the product Lop sine Lap which is used to make the meridian convergency correction is connected to one of the input sides of the differential 87 so that the heading quantity from the directional gyros may be combined with this correction quantity.

If correct true heading reference is available from the astro tracker 92, the transformer 94 and rectifier 100, the annunciator control 106$_a$ and the annunciator 114 with their associated switching may be used to indicate the error in the calculated true heading as explained above for the Slaved Magnetic-Manual Variation-Normal Coordinate mode. However, in the present mode when the annunciator function selector 108 actuates the relay 106 to place the arm of switch 104 in position $b$, the displayed error observable in the annunciator in calculated true heading H$_t$ must be removed by adjusting a set knob (not shown) on the annunciator control, rather than the navigational computer's manual variation differential transmitter which was employed to cause the error to be removed when the adapter was operated in the slaved magnetic mode.

When the adapter is operated in the directional gyro mode, the relay A' actuated by the heading mode selector 10 causes the arms of the switch 66 to contact the contacts $b$ and $h$ which applies a zero variation signal from the control transformer 230 to the variation differential transmitter in the navigation computer. The variation display servo will then display and apply zero variation in the navigation computer.

IV. *Directional gyro-normal coordinate-automatic earth rate correction mode*

As in the previous mode of operation, the true heading H$_t$ is calculated by the polar heading adapter and introduced to the navigational computer. The corrections of true heading for transmission error T$_c'$ meridian convergency and the zeroing of the variation display circuit of the computer are also similarly achieved.

In this mode, the polar heading adapter continuously and automatically computes the gyro earth rate correction which was previously manually determined in the gyro units.

In general, the earth rate correction is computed by the earth rate correction section of the adapter which places the correction quantity into the gyro units on the lead 153 when the switch 11 is in automatic earth rate correction position so that contacts $k$ and $n$ are made by the switch arms for the leads 154 and 153. This correction is represented by the wiper voltage on correction potentiometer 178 measured with respect to lead 183. The ends of the potentiometer 178 are connected to the reference leads 156 and 157 while the wiper therefor is connected to the output lead 153 by means of lead 180 and the contact $k$ of the switch 11. Either side of the potentiometer 178 may be connected to the output circuit by contacts $a$ and $b$ of the north-south selector switch 182, lead 183 and contact $n$ of the switch 11. Earth rate correction may be mathematically calculated by multiplying the sine of present latitude by the earth's rotational velocity. Control transformer 181 determines this quantity by virtue of the fact that it is connected to the Lap lead 131 by lead 182 and has its rotor locked to ground so that in effect it can be operated as a single output winding transolver. The output of the control transformer 181 is introduced by lead 183 to contact $a$ of switch 184 controlled by the relay C'' connected to the relay input lead 34$_a$ by lead 185. This relay is actuated by the coordinate system selector 22 and places the switch 184 in normal coordinate position in this operational mode of the adapter. Contact $a$ of switch 184 being connected to north-south potentiometer 186 is thereby to adapt this component to yield earth rate correction, sine Lap, to a servo loop comprising servo amplifier 187, servo motor 188, slip friction clutch 190 and servo loop nulling shaft 191. The shaft 191 is also in dividing connection with shaft 192 which is connected to the wiper of the potentiometer 178 so as to cause the latter to yield the desired earth rate correction to the directional gyros. A reference voltage is provided for the potentiometer 186 by means of lead 193 connected to the second output winding of transformer 132 whose first output winding is nulled by the latitude servo 134 and whose second or cross winding can, therefore, supply the desired reference voltage. This reference voltage is supplied to contacts $a$ and $c$ or contacts $b$ and $d$ of the switch 194. The switches 182 and 194 are driven in accordance with the value sine Lap through the shaft 192, intermittent gear mechanism 195 and the switch actuating shaft 196. The switch 194 thereby causes reference voltage to be applied to the contacts $a$, $b$, $c$ and $d$ of the switch 194 in both north-south positions and permits the manual earth rate correction output voltage of the potentiometer 178 to be referenced to reference negative in the Northern Hemisphere and to a reference positive voltage in the Southern Hemisphere, as determined by the positioning of the switch 194 and the connection through contacts *a* or *b* of the switch 182 of one side or the other of the potentiometer 178 to reference lead wire.

The friction slip clutch 199 on the output shaft 191 of the motor 188 prevents the motor from harming the potentiometer 186 when its wiper is driven into the limit stops of the potentiometer.

V. *Directional gyro-transverse coordinate-manual earth rate correction mode*

When operating in this mode, relay A is disposed in the directional gyro position so that D.C. voltage is supplied to the relay A and A' and relay B is unenergized due to the fact that the heading mode selector is placed in the directional gyro position. Coordinate system selector 22 is turned to the transverse coordinate position so that the relays C and C" actuate the switches 139 and 184, respectively, positioning them in the down or transverse coordinate position.

All heading and heading correction computations are made in the same manner as when the adapter is functioning in the Directional Gyro-Normal Coordinate-Manual Earth Rate Correction mode except that all calculations are made in the transverse coordinate system and the true heading output is referenced to the transverse pole formed by the intersection of the normal 180° meridian and the equator. Accordingly, the heading output from the directional gyro 50 is supplied to the adapter having been previously modified so that the heading is referenced to the transverse meridian of the plane's local position. In this mode, earth rate correction is supplied the gyro units as in the Directional Gyro-Normal Coordinate-Manual Earth Rate Correction mode. As in that mode, the switch 11 operated by the heading mode selector 10 positions the arms connected to leads 153, 154 so that they make contact with the contacts *l* and *o*, respectively, which permits the manual introduction of this correction to the gyros for supplying heading values corrected for earth movement to the adapter. The Directional Gyro mode must be used when operating in the vicinity of the magnetic poles.

If an astro tracker is available as a true heading reference in the transverse coordinate system, the polar heading adapter has the facility of correcting the calculated true heading as described for the adapter when operated in the Directional Gyro-Normal Coordinate-Manual Earth Rate Correction mode.

VI. *Directional gyro-transverse coordinate-automatic earth rate correction mode*

This mode may also be employed by the adapter when the latter is being operated in the normal polar regions. All its relays are in the positions assumed in the previous mode. The polar heading adapter and the navigational computer operate in the same manner as in the previous mode except that the gyro earth rate correction is automatically made.

In operating the adapter on the basis of the normal coordinate's earth rate correction, they found it to be proportional to the sine of the present latitude. It is known that this correction for normal coordinates is related to the earth rate correction for transverse coordinates as follows:

$$2 \sin \text{Lap} = \cos[(\text{Q-Lap}) - (\text{Q-Lop})] + \cos[(\text{Q-Lap}) + (\text{Q-Lop})]$$

Accordingly, the quantity Q-Lap is applied to the lead 131 by the indicator 120 and introduced to the control transformer 197, the rotor of which is positioned by the Q-Lop shaft 128 through the shaft 198. Control transformer 200 is enabled to apply a voltage to the rotor of the control transformer 197 by a lead $201_a$ which is proportional to the quantity $\cos[(\text{Q-Lap}) - (\text{Q-Lop})]$ because the rotor of the transformer 200 is positioned by the Q-Lap shaft 136 and electrically receives the quantity Q-Lop on the lead 201 which is connected to the navigational computer indicator lead 122. The rotor voltages of the two control transformers are combined in the network 202 which is adapted to attenuate the added rotor voltages to match the scale factor of the "resolver" 181. The earth rate correction, sine Lap, output of the network 202 is added to the response voltage of the potentiometer 186 through the switch 184 in transverse coordinate position and applied to the amplifier 187. The potentiometer 178 is, accordingly, able to supply earth rate correction to the gyros arranged to the transverse poles in the manner described in the Directional Gyro-Normal Coordinate-Automatic Earth Rate Correction mode.

VII. *Slaved magnetic-automatic variation-transverse coordinate mode*

This mode of operation may be adopted when the polar heading adapter is computing below the normal polar regions. The true heading is determined by the navigational computer on the basis of the same inputs provided by the adapter when operating in the Slaved-Magnetic-Automatic Variation-Normal Coordinate mode when magnetic heading $H_c$ from the amplifier 50 being routed through contact *a* of the switch 58 is actuated by the relay A.

Additionally, corrections for polar correction and transverse magnetic variation must be made available to the navigational computer's electrical zero or drift heading input. The computation on these corrections depend on whether the adapter is operating in the Northern or Southern Hemispheres, the appropriate correction being transmitted to the navigational computer selectively from differential transmitter 204 for the Northern Hemisphere and 205 for the Southern Hemisphere, both controlled through the switch 222. The relay 206 is arranged to selectively actuate the switch 222 according to the energization of its input lead 207. D.C. voltage is adapted to be impressed on this lead through the make and break switch 208 which is operated by the intermittent mechanism 172 and the Q-Lap shaft 171. The switch 208 is connected to the D.C. input lead 12 by means of the switch 36 placed in transverse coordinate position and the switch 11 is placed in magnetic heading position which permits the D.C. voltage to be impressed on the input side of the switch 208 by virtue of the connecting lead 210.

Polar correction $P_c$ may be defined as the angle equal to the difference between the polar correction angle and an angle that varies linearly with transverse longitude. This correction is a function of transverse latitude, Q-Lap, and transverse longitude, Q-Lop, which quantities are fed to the three-dimensional polar correction cam 211 from the indicator 120 on the latitude and longitude servo shafts 136 and 128, respectively. These shafts are also connected to drive the transverse variation cam 212. The $P_c$ output of the follower of the polar correction cam 211 is placed in one side of the differential 213 into the other side of which is placed the transverse longitude by means of shaft 214 which is connected to the transverse longitude shaft 126. Differential output shaft having the correction angle (Q-Lop)+$P_c$ on differential output shaft 215 displaces north differential 216 and south differential 217. Transverse variation, Q-Va, is placed into another input side of the two differentials by the transverse variation cam 212 on the follower shaft 218. The output side of the north differential 216 is connected to the differential transmitter 204 by shaft 220. The differential transmitter 204 is initially set to transmit the angle 180° to which the transverse variation Q-Va is added and from which the polar correction Q-Lop plus $P_c$ is subtracted. The output of the differential transmitter 204 on lead 221 is placed on the navigational computer's angle output lead 72 through contact *c* of the switch 222 operated by the north-south relay 206, the switch 139 in transverse coordinate position, the relay therefor connected to the lead 34*a* by connection 223, the lead 143, the contact *j* of the gang switch 62 placed in automatic variation position, the lead 71 and contact *c* of the switch 66 actuated by relay A' placed in slaved magnetic position. The electrical zero or drift heading output lead 64 of the navigational computer feeds this quantity from the computer to the differential transmitter 204. To this end, the lead 64 is connected to the lead 67 through contact *e* of the switch 66 actuated by relay A', the contact *n* of the gang switch 62, the lead 224, contact *b* of the switch 139, contact *a* of the switch 222 and the differential transmitter input lead 225.

The south differential transmitter 205 is additionally set at zero degrees and the polar correction and transverse variation quantities on differential shaft 226 of the differential 217 are added to the zero degree setting with the switch 222 set in south position by the relay 206. The output of transmitter 205 is fed to the navigational computer as from the transmitter 204, employing, however, the transmitter output and input leads 227 and 228, respectively, and transmitter output, input contacts *d* and *b* of the switch 222.

FIG. 2 is a plot of polar correction angle versus transverse longitude and latitude. Curves are drawn for the latitude parameter equal to 90° north, 15° north, 0°, 15° south and 90° south latitude. The shaded sections of the figure represent the areas of the world above 70° normal latitude in both hemispheres. In these areas, polar correction cam 211 cannot provide the required correction angle because of mechanical limitations on the construction of cams which have so far been designed to provide such a correction quantity. However, the dotted lines of the figure indicate what correction angle would be required if operation above 70° normal latitude were permitted.

Corrections at 40° west, 90° west, 140° west, 140° east, 90° east and 40° east Q-Lop shall be considered in two flights around the world, one by aircraft A, which will fly at a constant 15° north Q-Lap, and the other by aircraft B, which will fly at a constant 15° south Q-Lap. It will be assumed the aircraft will fly directional gyro above 70° normal latitude and both aircraft shall fly westerly from a 0° Q-Lop initial longitude.

The switching described above causes north Q-Lap differential transmitter 204 to transmit in aircraft A and causes south Q-Lap differential transmitter 205 to transmit in aircraft B. The transmitters 204 and 205 are set to respectively provide 180° and 0° angle output at 0° Q-Lop.

Referring to FIGURE 2, at 40° west Q-Lop the polar correction cam output $P_c$ is 33°. This $P_c$ quantity is added to the 40° longitude charge in differential 213 to provide a 33°+40° or 73° input to differentials 216 and 217. In aircraft A the differential 216 subtracts the 73° output of the differential 213 from the magnetic variation output of the cam 212, and thereby decreases the initial 180° angle output of the transmitter 204 by 73° to 107° and increases this 107° polar correction output by the magnetic variation existing at 15° north Q-Lap and 40° west Q-Lop. In aircraft B the differential 217 adds the 73° output of differential 213 to the output of the cam 212 and thereby increases the initial 0° angle output of the transmitter 205 by the 73° polar correction and the magnetic variation existing at 15° south Q-Lap and 40° west Q-Lop.

At 90° west Q-Lop the $P_c$ output of cam 211 is zero and the output of the differential 213 will only be the 90° longitude change. In aircraft A differential 216 subtracts this 90° from the magnetic variation output of the cam 212 and thereby decreases the initial 180° angle output of the transmitter 204 by 90° and increases this 90° polar correction by the magnetic variation existing at 15° north Q-Lap and 90° west Q-Lop. In aircraft B the differential 217 adds the 90° output of the differential 213 to the output of the cam 212 and thereby increases the initial 0° angle output of the transmitter 205 by the 90° polar correction and the magnetic variation existing at 15° south Q-Lap and 90° west Q-Lop.

At 140° west Q-Lop the $P_c$ output of the cam 211 is −33°. The differential 213 adds this −33° cam output to the 140° longitude input to provide 140°−33°, or 107° to the differentials 216 and 217. In aircraft A this 107° is subtracted from the output of the cam 212 in the differential 216 and thereby causes the angle output of the transmitter 204 to be 180°−107°, or 73° polar correction, plus the magnetic variation existing at 15° north Q-Lap and 140° west Q-Lop. In aircraft B the 107° output of the differential 213 is added to the output of the cam 212 in differential 217, causing the angle output of the transmitter 205 to be the 107° polar correction plus the magnetic variation existing at 15° south Q-Lap and 140° west Q-Lop.

From 165° west Q-Lop to 165° east Q-Lop, both aircraft will be above 70° normal latitude and must fly directional gyro. It should be noted in FIGURE 2 that the 90° south Q-Lap asymptote of the transmitter 205 is continuous through 180° Q-Lop (+180° correction angle equals −180° correction angle).

At 140° east Q-Lop (200° west from 0), the $P_c$ output of the cam 211 is +33° and adds to the 220° longitude change in the differential 213 to provide a 253° input to differentials 216 and 217. In aircraft A the 253° output of the differential 213 is subtracted from the output of the cam 212 in the differential 216 and thereby causes the angle output of the transmitter 204 to be 180°−253°, or −73° polar correction plus the magnetic variation existing at 15° north Q-Lap and 140° east Q-Lop. In aircraft B the 253° or −107° output of the differential 213 is added to the output of the cam 212 in the differential 217, causing the angle output of the transmitter 205 to be the −107° polar correction, plus the magnetic variation existing at 15° south Q-Lap and 140° east Q-Lop.

At 90° east Q-Lop (270° west from 0), the $P_c$ output of cam 211 is zero so that the output of the differential 213 will be only the 270° longitude change. The differential 216 in aircraft A subtracts this output from the output of cam 212 and causes the angle output of transmitter 204 to be 180°−270°, or −90° polar correction, plus the magnetic variation existing at 15° north Q-Lap and 90° east Q-Lop. The differential 217 in aircraft B adds the 270° (or −90°) output of the differential 213 to the output of the cam 212 and causes the angle output of the transmitter 205 to be the −90° polar correction, plus the magnetic variation existing at 15° south Q-Lap and 90° east Q-Lop.

At 40° east Q-Lop (320° west from 0) the −33° $P_c$ output of the cam 211 is added to the 320° longitude change in the differential 213 to provide a 287° (or −73°) input to the differentials 216 and 217. In aircraft A, the differential 216 subtracts this 287° from the output of the cam 212 and causes the angle output of the transmitter 204 to be a 180°−287°, or −107° polar correction, plus the magnetic variation existing at 15° north Q-Lap and 40° east Q-Lop. In aircraft B the differential 217 adds the −73° output of the differential 213 to the output of the cam 212 and causes the angle output of the transmitter 205 to be the −73° polar correction, plus the magnetic variation existing at 15° south Q-Lap and 40° east Q-Lop.

It should be noted in FIGURE 2 that the 90° north Q-Lap asymptote of the transmitter 204 is continuous through 0° Q-Lop. (−180° correction angle equals +180° correction angle.)

The cam 212 positions transformer 230 with transverse magnetic variation which is transmitted to the navigational computer through contacts *d* and *f* of the switch 145, contacts *a* and *g* of the switch 66 and contacts *d* and $f$ of the switch 62. The variation display follow-up system described for the Slaved Magnetic-Automatic Variation-Normal Coordinate mode will cause this calculated variation to be displayed by the navigational computer. Additionally, this system includes a provision for introducting a D.C. relay signal required by the navigational computer when displaying west automatic transverse variation which includes contact $d$ of the heading mode selection switch 11, contact $a$ of switch 231 controlled by cam 212, shaft 218 and intermittent shaft 232, contact $b$ of switch 145 and contact $l$ of switch 62 by the lead 151.

VIII. Polar heading adapter alignment when starting in directional gyro modes The system provides means for insuring that the polar heading provided to the navigational computer 55 from the polar heading adapter is the same as that supplied by the directional gyros in the J-4 servo amplifier 50. The latter quantity is placed into the control transformer 75 through contact $d$ of the switch 74 operated by the relay D. The relay D is energized when the heading mode selector is placed in either of the directional gyro modes and the alignment selector 44 places the arms of the switch 42 in align position so at to place D.C. voltage onto the relay D connection 40. The other input on shaft 91 to the control transformer 75 represents the J-4 gyro heading and any difference existing between this quantity and the heading quantity on the shaft 91 is placed on the control transformer output lead 76 as an error. The relay D' being in align position, this error is expressed on contact $b$ of the switch 80 and controls the amplifier 77 to cause the motor 84 to position the control transformer 75 with the gyro heading until the error is nulled and the heading on shaft 91 is in agreement with the J-4 gyro heading on lead 52.

The heading error is also employed to actuate the annunciator 114 so that the pilot is informed when the computer and gyro headings have been aligned. The output of the control transformer 94 being driven by the shaft 97 representing heading and J-4 gyro heading from lead 52 through contact $a$ of switch 74 is placed in the rectifier 100 and conveyed by lead 102 to the annunciator control 106a through contact $b$ of the switch 104 and the lead 107. The annunciator 114 is activated by the annunciator control 106a and is thereby adapted to display the heading error. The switch 104 is placed in the contact $b$ position and the flag mechanism is energized to indicate PHA (i.e. polar heading adapter) Astro because a D.C. voltage is placed on the relay and flag mechanism connections 109 and 109a, respectively, from the input lead 12 by means of the connecting lead 16, the contact $f$ of the heading mode selector switch 11, the leads 14 and 46, and the contact $a$ of the alignment selector switch 42.

What is claimed is:

1. A polar heading adapter designed for association with a navigational computer comprising a circuit for selectively conveying magnetic compass heading or gyro heading information to the navigational computer and said adapter, a normal variation correction three-dimensional cam with follower, a transverse variation correction three-dimensional cam with follower, a polar correction three-dimensional cam with follower, computer output shafts settable in accordance with present positions of latitude and longitude in normal or transverse coordinates, the shafts settable in accordance with present position of longitude being connected to rotate said three-dimensional cams and the shafts settable in accordance with present position latitude being connected to position the followers of said cams, means connected to said normal variation correction cam follower for selectively conveying normal variation corrections to the computer, a differential one input side of which is connected to the longitude present position shaft and its other input side connected to the follower for said polar correction cam, a pair of differentials, one input side of each differential of the differential pair being connected to receive the output of said first mentioned differential, the other input side of each differential of the differential pair being connected to the follower for the transverse variation correction cam, a north differential transmitter initially settable to 180° and connected to be driven in a given direction by the output of one differential of the differential pair, a south differential transmitter initially settable to zero degree and connected to be driven in the other direction by the other differential of said differential pair, said north and south differential transmitters being set to respectively provide 180° and 0° angle output at 0° transverse longitude, means for selectively introducing the output of said north or south differential transmitter to the computer, means for computing directional gyro true heading corrections and selectively introducing said corrections to said magnetic compass heading or gyro heading information circuit, said true heading correction computing means including meridian convergency calculating means connected to receive in normal or transverse coordinates present position information from said computer output shafts and a computer transmission error cam in driven connection with said meridian converging calculating means and means for combining the true heading corrections whereby the combined true heading corrections may be selectively introduced to the heading information circuit.

2. A polar heading adapter as claimed in claim 1 wherein the meridian converging calculating means comprises a sine resolver connected to be driven by said latitude present position shaft and a ball carriage and disc integrator, said carriage being positioned by the output of said sine resolver and the disc being driven by the longitude present position shaft.

3. A polar heading adapter as claimed in claim 2 wherein the means for computing directional gyro true heading includes an error sensing loop, including a control transformer permanently connected to the heading information circuit, the output of said control transformer being selectively connected to a servo amplifier, an error sensing circuit and a servo motor energized by said servo amplifier, an error feedback connection being provided between the output shaft of said servo motor and the control transformer, a magnetic clutch controlled by said error sensing circuit and connected to block the output of said true heading combining means when the error sensing circuit and servo amplifier are energized and to pass the output of said true heading combining means when the error sensing circuit and servo motor are deenergized, means for selectively introducing to said error sensing circuit a D.C. voltage when the adapter is operated to generate gyro true heading which include meridian convergency and transmission error corrections.

4. A polar heading adapter as claimed in claim 3 wherein there is provided a computer output connection adapted to receive the magnetic true heading from the computer, and an alignment error sensing loop including a second control transformer selectively connected to said computer output connection on its input side and selectively connected to the servo amplifier on its output side, alignment error feedback means connecting the output of said true heading combining means with the second control transformer whereby said alignment error sensing loop is adapted to detect any discrepancies between the true heading as calculated by the adapter and the true heading employed by the computer after transmittal thereto by the adapter.

5. A polar heading adapter as claimed in claim 4 wherein there is provided a heading error circuit having a third control transformer selectively energized by said heading information circuit connected to said alignment error feedback means, a signal rectifier connected to said third control transformer and an annunciator control circuit selectively connected to said signal rectifier and adapted to indicate heading error.

6. A polar heading adapter as claimed in claim 5 wherein there is provided a remote sighting astro tracker in selective connection with said third control transformer whereby said annunciator circuit is adapted to compare computed and sighted values of true heading.

7. A polar heading adaper as claimed in claim 6 wherein there is provided earth rate correction computer, such computer being connected to said longitude and latitude position shafts and selectively energizable whereby the polar heading adapter is adapted to compute earth rate corrections so that they may be made available to the heading information circuit when it is desired that these corrections be introduced thereto automatically.

8. A polar heading adapter as claimed in claim 7 wherein said earth rate correction computer includes means for calculating the quantity ½ cos [(Q-Lap)−(Q-Lop)]+½ cos [(Q-Lap)+(Q-Lop)] which is equal to sine Lap or earth correction where Q-Lap is transverse latitude and Q-Lop is transverse longitude and Lap is normal latitude present position.

9. A polar heading adapter as claimed in claim 8 wherein there are provided means controlled by the normal and transverse variation three-dimensional cams for selectively conveying a D.-C. voltage to the navigational computer when the output of said cams is in west variation.

References Cited in the file of this patent

UNITED STATES PATENTS

| | | |
|---|---|---|
| 2,752,091 | McKenney et al. | June 26, 1956 |
| 2,843,318 | Gray | June 15, 1958 |
| 2,908,902 | Gray et al. | Oct. 13, 1959 |
| 2,951,639 | McKenney et al. | Sept. 6, 1960 |